Nov. 17, 1931.    C. J. HOBART ET AL    1,832,302
MEAT SLICING MACHINE
Filed May 1, 1930    6 Sheets-Sheet 2

Inventors
Charles J. Hobart
George R. Fisk
by Parker & Carter
Attorneys.

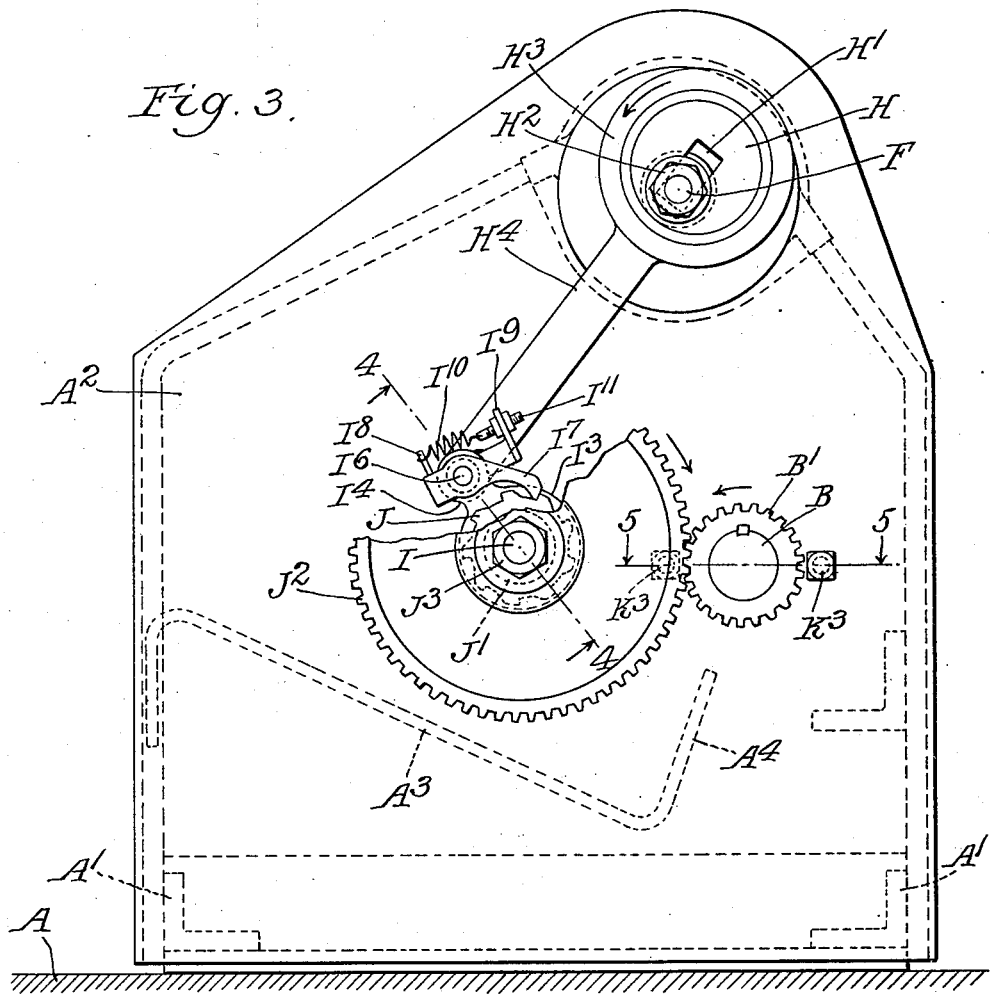
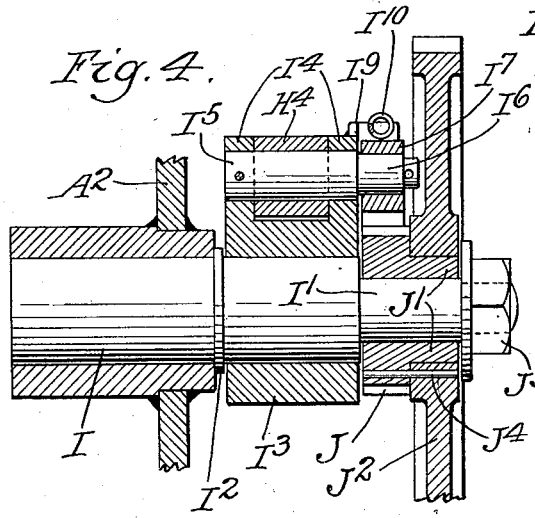
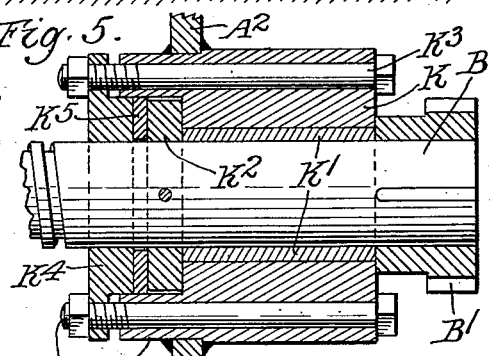

Inventor
Charles J. Hobart
George R. Fisk
by Parker + Carter
Attorneys.

Nov. 17, 1931.  C. J. HOBART ET AL  1,832,302
MEAT SLICING MACHINE
Filed May 1, 1930   6 Sheets-Sheet 5
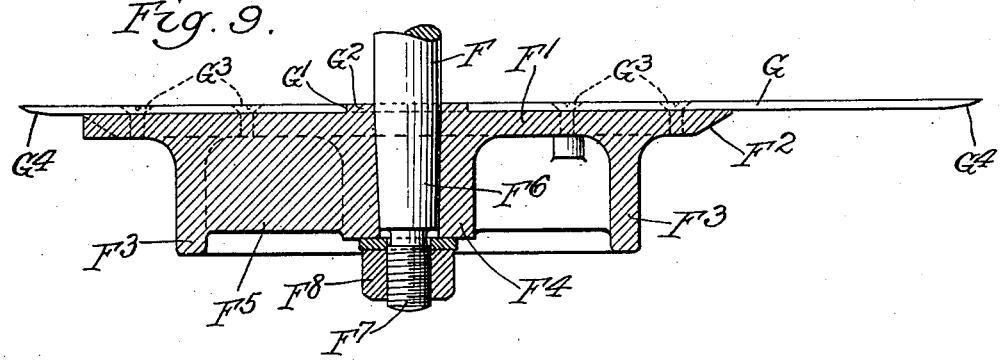
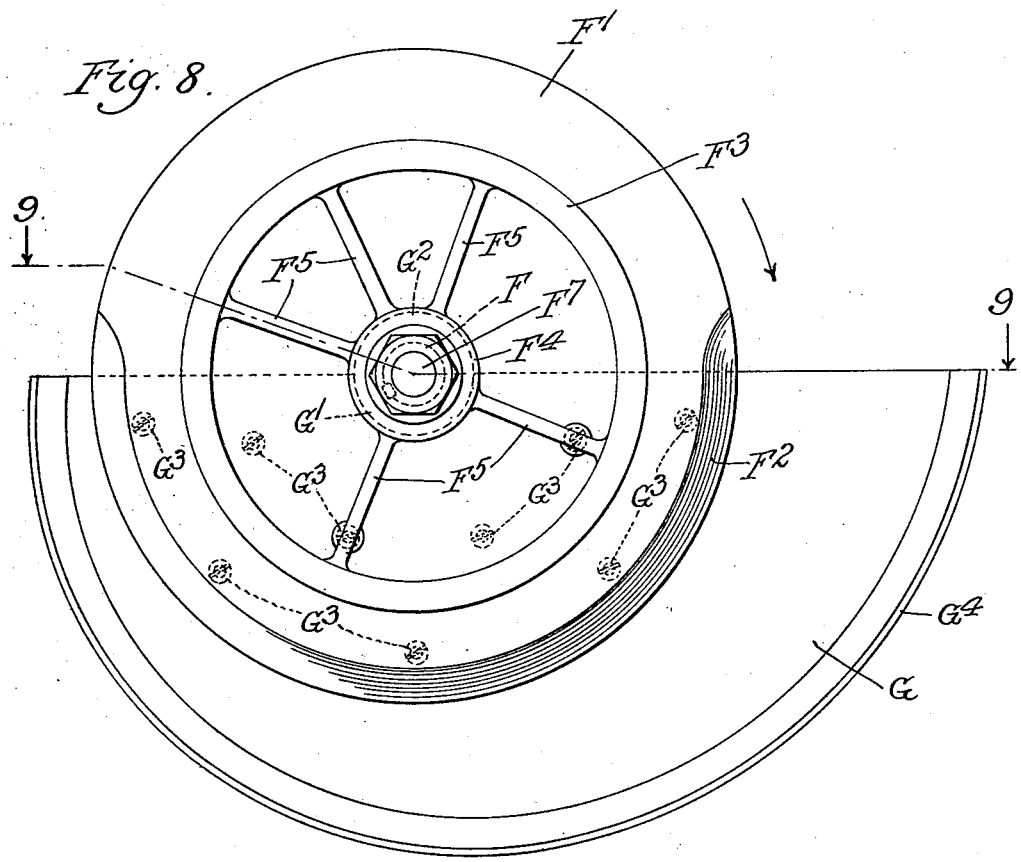
Inventors
Charles J. Hobart
George R. Fisk
by Parker + Carter
Attorneys.

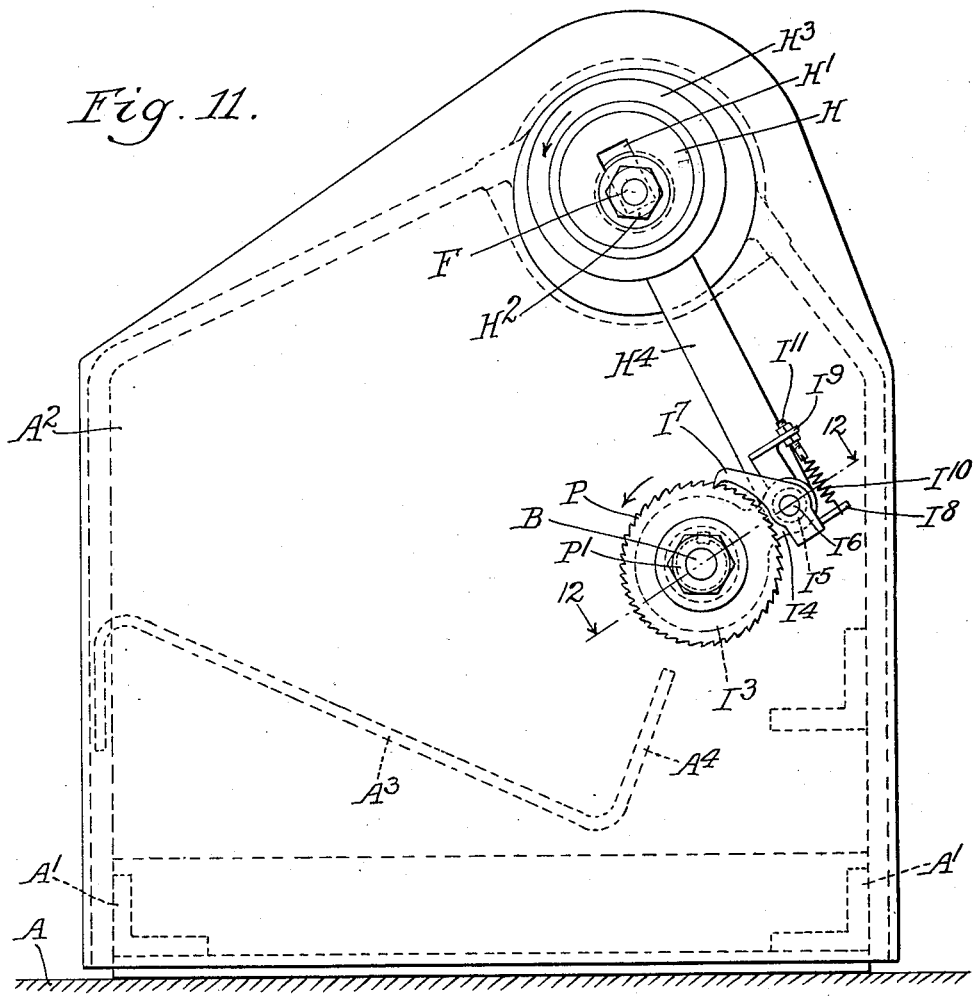
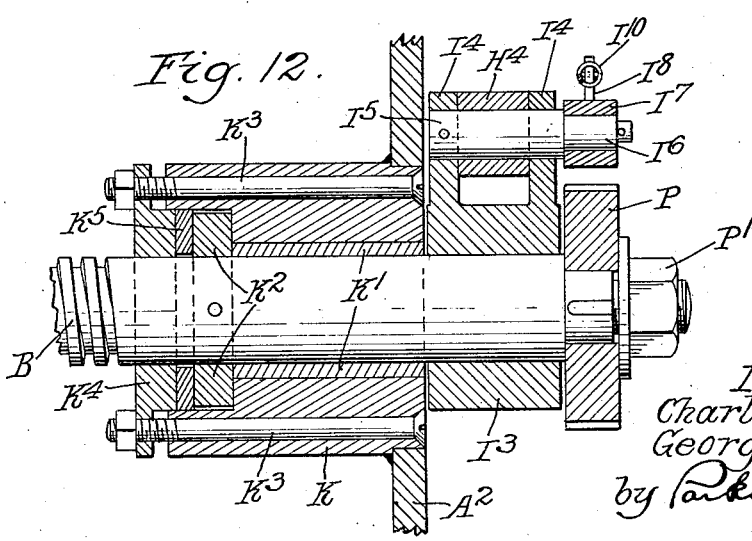

Patented Nov. 17, 1931

1,832,302

UNITED STATES PATENT OFFICE

CHARLES J. HOBART, OF CHICAGO, AND GEORGE R. FISK, OF HARVEY, ILLINOIS, ASSIGNORS TO LINK-BELT COMPANY, OF CHICAGO, ILLINOIS, A CORPORATION OF ILLINOIS

MEAT SLICING MACHINE

Application filed May 1, 1930. Serial No. 448,858.

This invention relates to a meat cutting machine. While it is not limited to a machine of any particular size or dimension, its mechanical features are for many purposes most important when embodied in a large machine and in a machine which is designed to do heavy, continuous cutting of large bodies of material. In its present form the invention is particularly adapted for use as a meat slicer and it is used to cut and slice large pieces of meat and is of sufficient strength to cut through the meat and bone. It may be used, for example, in slicing pork chops and when so used an entire side of pork is put into the machine and cut into slices, the machine cutting meat and bone and operating continuously to cut up the entire piece.

One object of the invention is to provide an improved knife construction in which the blade is preferably laid out on a logarithmic spiral in which the radii increase uniformly as the cutting edge of the blade increases in length. Another object of the invention is to provide an improved counter-weighted blade holding construction. A further object is to provide a blade holding construction in which a flywheel, counter-weight and knife are combined.

Other objects will appear from time to time in the specification and claims.

Our invention is illustrated more or less diagrammatically in the accompanying drawings, wherein:

Figure 3 is an end view showing a portion of the transmission with parts broken away and with the transmission housing removed. It shows the opposite end from that shown in Figure 2;

Figure 4 is a detailed longitudinal cross sectional view on an enlarged scale taken at line 4—4 of Figure 3;

Figure 5 is a detailed longitudinal cross section of a portion of the transmission on an enlarged scale taken at line 5—5 of Figure 3;

Figure 8 is a side elevation of the knife counter-weight assembly;

Figure 9 is a transverse cross section taken at line 9—9 of Figure 8;

Figure 11 is a view generally similar to Figure 3, showing a modified form of the invention;

Figure 12 is a detailed cross section taken on an enlarged scale at line 12—12 of Figure 11.

Like parts are designated by like characters throughout the specification and drawings.

A indicates a foundation or support upon which the machine may be positioned. Where the machine is one of a large size, handling large pieces of material for cutting, the foundation may be of concrete or other permanent material and the machine may be fixed to it permanently, being connected to the foundation by members which are embedded in the concrete. A longitudinal framework is provided. It may be formed of angle members $A^1$ $A^1$ and vertically disposed end members $A^2$ $A^2$ which may be of any suitable construction. A work holding shelf or plate $A^3$ is supported in the framework. The main surface of the member $A^3$ is inclined inwardly toward the axis of the knife and is provided with a relatively inclined portion $A^4$ which is inclined upwardly with respect to it. The left hand frame member $A^2$ is cut away so as to provide an opening $A^5$. $A^6$ is a piece secured by screw $A^7$ and having an edge $A^8$.

Figure 1:
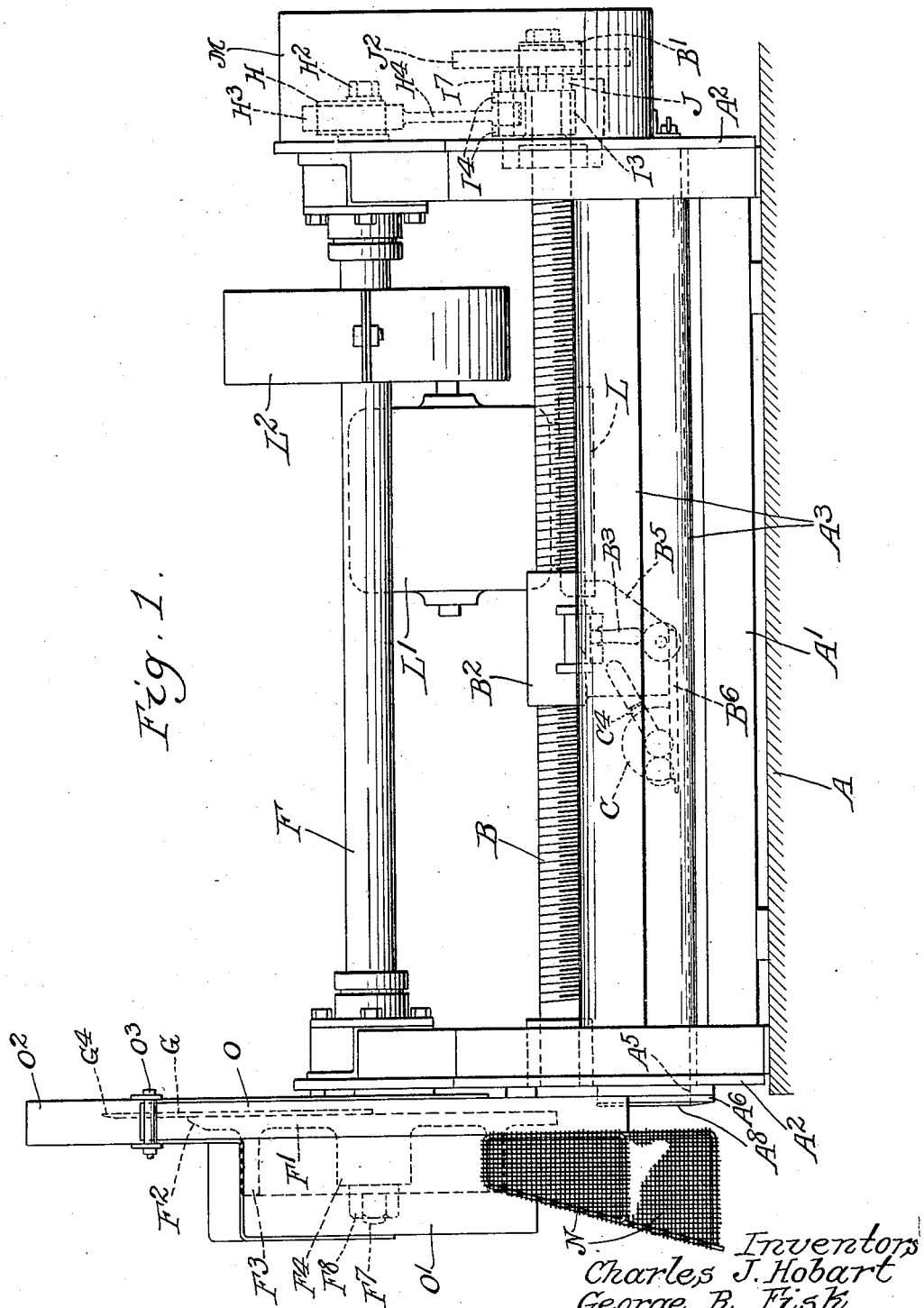
Figure 1 is a side elevation of the machine as a whole.

Supported in suitable bearings in each of the members $A^2$ $A^2$ is a feed screw B, at one end of which, namely, the right hand end, as shown in Figure 1, a pinion $B^1$ is fixed. Positioned about the feed screw B is a collar $B^2$ which is provided with an interiorly threaded portion, not shown. This portion may be moved into and out of contact with the threads of the feed screw B and it is controlled by a lever or handle B². A spring B⁴ normally tends to hold this handle in an upright position. The details of the engaging devices are not shown as they form no particular part of the present invention. It is sufficient that means be provided for engaging and disengaging the collar B² with the threads of the feed screw B. Extending downwardly from the collar B² is a member B⁵ to which is attached a carrier plate B⁶. B⁷ is a reinforcing member extending between the plate B⁶ and the member B⁵ and reinforcing them. The plate B⁶ may be thinned or reduced adjacent its forward edge as at B⁸ and may be roughened or provided with upwardly extending engaging points B⁹.

Figure 7:
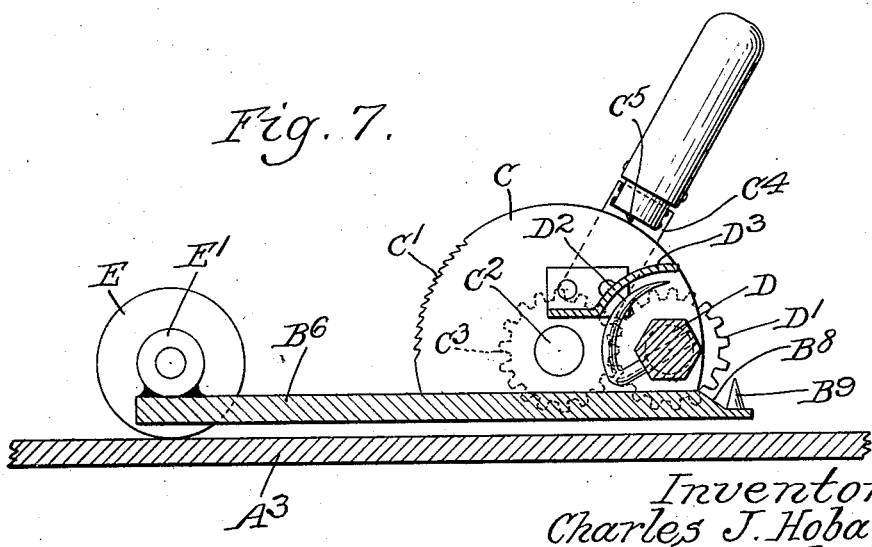
Figure 7 is a cross section of the material engaging assembly taken on line 7—7 of Figure 2, on an enlarged scale.

Mounted adjacent the outer end of the carrier plate B⁶ and extending upwardly away from the face of that plate is a curved member C. It is provided in one edge with a notched arcuate section C¹. A short stud C² is mounted rigidly in the plate C and journaled on it is a pinion C³. Fixed to the pinion C³ is a handle C⁴. A pawl C⁵ is provided in the handle and it may engage with one of the notches C¹. Any suitable means may be provided for moving the disc into and out of engagement with the notches. This means need not be described as it forms no particular part of the present invention. It is sufficient that the pawl may be moved into the disengaged position so that the handle may be rotated to a position such as that shown in Figure 7.

Figure 2:
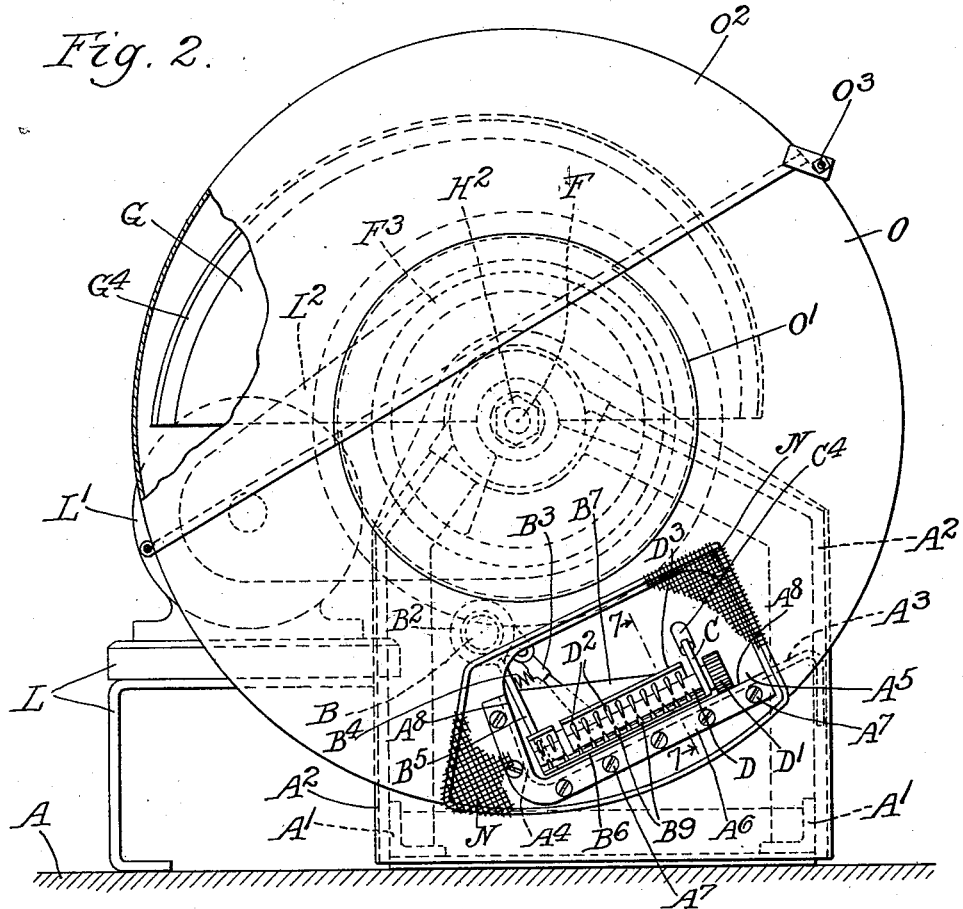
Figure 2 is an end view with parts broken away and parts in section.
Figure 6:
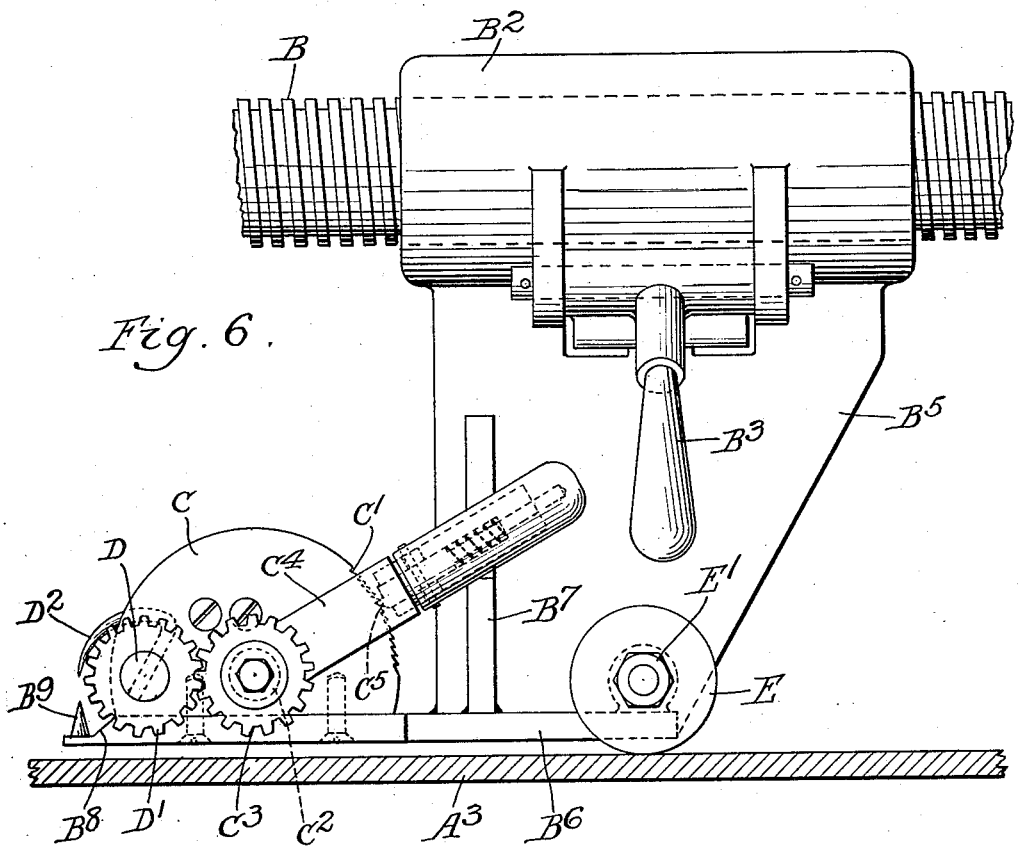
Figure 6 is a side elevation of the material engaging assembly, with parts in section.

Journaled at one end in the plate C and at the other end in any suitable bearing supported in fixed relation with the carrier plate B⁶ is a shaft D. At its outer end the shaft carries a pinion D¹ which meshes with the pinion C³. Fixed on the shaft D are a number of hooks or teeth D². In the form shown these hooks are formed of wire and extend through the shaft and are bent partially about it. When the shaft is rotated in one direction the hooks are moved toward the pins B⁹ into a position such as that shown in Figures 2 and 6. When the shaft is rotated in the opposite direction the hooks are moved away from the pins B⁹ into a position such as that shown in Figure 7. These teeth or hooks may thus be moved toward or away from the pins so that they co-operate with them to engage an article which is to be cut.

E is a small wheel or roller mounted adjacent the outer end of the carrier plate B⁶ and supported in suitable bearings E¹. It is so positioned as to rest upon the upper surface of the member A³ and thus to support the carrier plate assembly and the material which it engages.

F is a knife shaft supported in suitable bearings in the frame members A² A². Fixed on the shaft is a combined counterweight and flywheel. This member may be made in any suitable fashion but in the form shown its several parts are made integrally with each other. It includes a generally circular disc-shaped member F¹ which, through a portion of its circumference, has a tapered edge F². Extending outwardly from the face of the disc F¹ is an annular flange or flywheel portion F³. F⁴ is a hub member. F⁵ F⁵ are spoke members arranged radially and extending from the hub F⁴ to the annular flange F³. As shown in Figure 8 these spokes are arranged unevenly about the circumference of the flywheel. This arrangement and the tapered edge serve to counterbalance the unbalance of the knife blade. The shaft F is preferably provided with a tapered end F⁶ and at its extreme end is provided with a reduced threaded portion F⁷. A nut F⁸ on the threaded end serves to secure the counterweight and flywheel assembly in position on the shaft. Lead or other material may be added in the pockets formed between the spokes F⁵ to produce the proper weight and balance. For some purposes this is not necessary but in certain constructions we find it of value.

Figure 10:
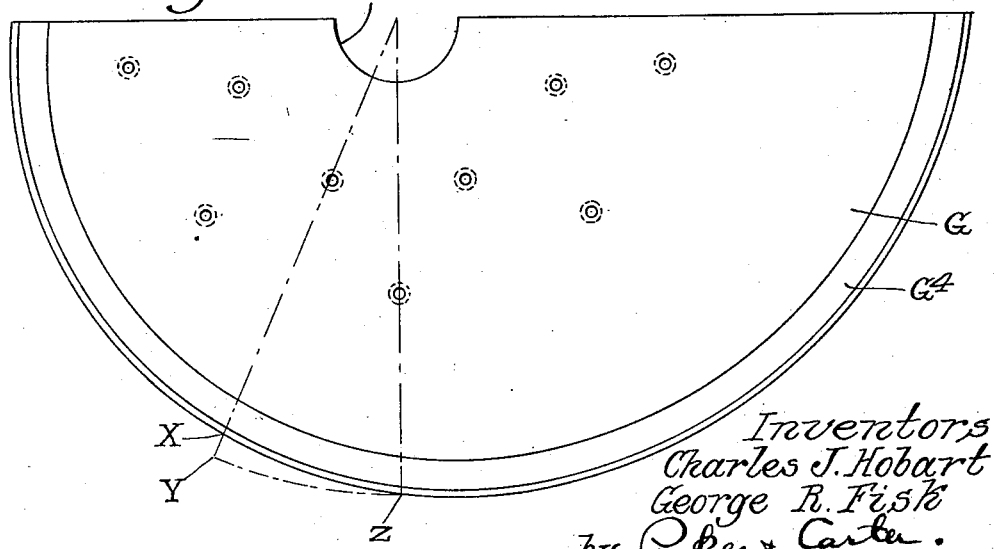
Figure 10 is a plan view of the blade removed from its associated parts.

G is a knife blade. It is provided with a semi-circular cut-away portion G¹ in its straight edge and this portion is seated about a raised annular flange G² in the back of the disc F¹. The blade is secured to the disc F¹ by screws G³. The blade is provided with a tapered or thinned cutting edge G⁴. As shown, the cutting edge of the knife extends through approximately 180° and this cutting edge is laid out as a logarithmic spiral, it being a characteristic of this particular spiral knife that a given increase in radii such as XY, as shown in Figure 10, requires the movement of a corresponding linear length of curved edge XZ and for a given knife the ratio of increase of radii XY to linear movement of edge XZ is a constant at any portion of the edge and for any increase in radii.

At its opposite end the shaft F has fixed upon it an eccentric H. The eccentric is slotted as at H¹. The shaft is reduced in size and given a rectangular cross section which corresponds in width to the slot H¹. H² is a nut which is threaded upon the end of the shaft F. By means of this construction the position of the eccentric and its throw may be adjusted. H³ is an eccentric ring positioned about the eccentric H and having connecting rod H⁴.

I is a stud positioned in the end frame member A². It is provided with a reduced portion I¹ and has an outwardly extending annular flange I² which serves to position it with respect to its support in the frame member A². Positioned about the stud I and between the portions I¹, I², is a ring I³. Extending upwardly from this ring are perforated ears $I^4$ $I^4$, within which the connecting rod $H^4$ is positioned and supported upon a pin $I^5$. This pin has a reduced portion $I^6$ upon which is positioned a pawl $I^7$. $I^8$, $I^9$ are supports for a spring $I^{10}$ which is effective to hold the pawl $I^7$ in contact with the teeth of a ratchet J which is mounted for movement upon the reduced portion $I^1$ of the stud I. The support $I^8$ is fixed on the pawl and the support $I^9$ is fixed on one of the ears $I^4$ of the ring $I^3$. The spring is in tension and its effect is, therefore, to force the nose of the pawl downward. $I^{11}$ is an adjustment for the spring $I^{10}$. The ratchet is provided with a reduced portion $J^1$ upon which is fixed a gear $J^2$ by means of a pin $J^4$. This pin may be of such a size or of such material as to break readily if abnormal resistances to the movement of gear $J^2$ develop. A nut $J^3$ serves to hold the parts in position and to prevent their separation. The gear $J^2$ meshes with the pinion B.

In Figure 5 there is shown one of the bearings of the feed screw shaft. The bearing housing K is positioned in a perforation through the frame member $A^2$. This may be done by welding, as shown, or otherwise. A bushing $K^1$ is positioned within the bearing housing and supports the shaft B. Fixed on the shaft is a collar $K^2$. Adjustably supported on the bearing housing by means of bolts $K^3$ is a collar $K^4$ which is positioned about the shaft and may be drawn into adjusted position with relation to the bearing housing. $K^5$ is a friction element lying between the members $K^2$ and $K^4$.

L is a motor support. It may be carried on the foundation A as indicated, or it might be carried upon the frame of the machine. $L^1$ is a motor positioned on the support and by means of a suitable driving connection not here shown, as it forms no particular part of the present invention, the motor drives the shaft F. The connection between the motor and the shaft is enclosed in the removable housing $L^2$.

M is a removable housing about the ends of the shaft F and the feed screw shaft B. It encloses the transmission connections between the two shafts.

N is a guard positioned generally opposite the opening $A^5$ in the left hand frame member $A^2$. It is provided with an open bottom and serves merely to keep the hands of the operator out of contact with the plate. Material being cut extends through the open bottom of the guard N.

O is the lower part of a housing which encloses a part of the blade counterweight and flywheel assembly. It is provided with a lateral extension $O^1$ which corresponds generally in size to the flywheel. $O^2$ is a movable part of the housing and it is preferably pivoted to the portion O by a hinge or pivot connection $O^3$.

It will be realized that while we have herein shown and described a practical operative device, nevertheless many changes might be made in the size, shape, number and disposition of parts without departing from the spirit of our invention and we wish, therefore, that our showing be taken as in a sense diagrammatic. In Figures 11 and 12 we have shown a modified form in which the stud I, the pinion $B^1$, the gear $J^2$ and other parts are omitted. Instead of the construction shown in Figure 3 a ratchet P is mounted directly on the feed screw shaft B and retained in position thereon by means of a nut or other suitable member $P^1$. In this construction the ring $I^3$ is positioned directly on the feed screw B. It and its associated parts are formed exactly like the ring $I^3$ and the associated parts shown in Figures 3 and 4. The connecting rod $H^4$ is positioned on the pin $I^5$ in the same manner as these parts are shown connected in Figure 3. The ratchet P as shown in Figure 11 is provided with a large number of teeth and while the pawl $I^7$ is shown as adapted to engage only a single tooth, we contemplate forming the pawl for some purposes and in some installations so that it engages a plurality of teeth at a time. Adjustment of the amount of throw of the type of our device shown in Figures 11 and 12 may be accomplished by changing the ratchet as in Figure 11 and substituting therefor one having a greater or a less number of teeth than that shown.

Adjustment may also be provided by adjusting the position of the connecting rod $H^4$ so as to vary its amount of throw. In the form of the invention shown in Figures 11 and 12, the bearing assembly and supporting arrangements for the shaft B are essentially the same as those shown in Figure 5.

The use and operation of our invention are as follows:

When the machine is to be used, the material carrier assembly is disengaged from the threads on the feed screw shaft and is moved in a direction away from the blade sufficiently to accommodate the material which is to be cut. The piece of material to be cut is then put in position, generally on the surface $A^3$, the teeth $D^2$ on the shaft D are raised in the position shown in Figure 7, the material is engaged upon the pins or teeth $B^9$, the shaft D is then rotated into the position shown in Figure 6 and the pins or teeth are forced into engagement with the material so that they, in co-operation with the pins $B^9$, grip the material. The material carrying assembly is now set in motion by moving the handle $B^3$ so that the interiorly threaded portion of the collar $B^2$ engages the feed screw B which is rotated, as described below, from the driven shaft F. This shaft is ordinarily constantly in motion when the machine is in use.

The eccentric on one end of the shaft F rotates and moves the connecting rod H⁴ back and forth. When it moves in one direction by means of the pawl I⁷, it drives the ratchet and so rotates the gear J² and through it the pinion B¹ which is fixed on the feed screw shaft B and thus rotates the material engaging assembly or carriage a fixed distance toward the knife and thus moves the material which is to be cut into the path of the knife. The parts are so proportioned that the feed screw shaft is given one turning motion for each rotation of the blade and thus one slice is cut at each rotation of the blade.

The amount of rotation which will be given to the feed screw and consequently the amount of forward movement of the carriage with the material which it engages are adjustable so that the thickness of the slices may be adjusted. This is accomplished by changing the relative sizes of the gear J² and the pinion B¹ thus permitting any given angular movement of collar I³, ratchet J and gear J² to cause different angular motions of pinion B¹ and shaft B. Fine teeth might be used and where used it might be convenient to provide the ratchet with parts adapted to engage several teeth at a time instead of the ratchet shown to engage only a single tooth as indicated in Figures 3 and 11. A further means of adjusting the thickness of slices is by changing the number of teeth in the ratchet J and by adjusting the eccentric H to cause a movement of pawl I⁷ to correspond to the teeth of the ratchet J. A further purpose for adjusting the throw of eccentric H is to reduce the movement of pawl I⁷ to the minimum necessary to engage the teeth of the ratchet I³, the magnitude of this movement being influenced by the speed of operation of the device as well as by the mechanical condition of the various parts. By this means the noise and shock caused by operation at high speeds may be reduced to a minimum. The member H is slotted and engages the squared end of the shaft F in its slot, and may be moved out or in with respect to that shaft and may be held in this adjusted position by the nut H². By this out or in movement the length of the throw of the eccentric is varied and consequently the amount of movement of the pawl I⁷ with each reciprocation of the consecting rod is varied.

We claim:

1. In combination in a cutting mechanism, a driven shaft, a flywheel fixed thereon, an unbalanced cutting member and counterweighting elements, including a disc and spokes and serving to counterbalance the unbalanced weight of the cutting member.

2. In combination in a cutting mechanism, a driven shaft, a flywheel fixed thereon, an unbalanced cutting member and counterweighting elements formed integrally with said flywheel, including a disc and spokes and serving to counterbalance the unbalanced weight of the cutting member.

3. In combination in a cutting mechanism, a driven shaft, a flywheel fixed thereon, an unbalanced cutting member and counterweighting elements formed integrally with said flywheel, including a disc and spokes and serving to counterbalance the unbalanced weight of the cutting member, and an added weight positioned upon said counterweight.

4. In a cutting mechanism, a flywheel and counterbalance, including an annular flange, a hub and a disc-like portion, the disc-like portion having throughout a part of its periphery a tapered edge, and a number of spokes joining the annular flange with the hub, an unbalanced cutting member, the arrangement and weight of the disc and spokes being such as to counterbalance the unbalanced weight of the cutting member.

5. In a cutting mechanism, a unitary flywheel and counterbalance, including an annular flange, a hub and a disc-like portion, the disc-like portion having throughout a part of its periphery a tapered edge, and a number of spokes joining the annular flange with the hub, an unbalanced cutting member fastened to the disc, the arrangement and weight of the disc and spokes being such as to counterbalance the unbalanced weight of the cutting member.

Signed at Chicago, county of Cook and State of Illinois, this 27th day of March, 1930.

CHARLES J. HOBART.
GEORGE R. FISK.